UNITED STATES PATENT OFFICE.

JAMES E. SHARP, ELEAZER AINSWORTH, AND FREDERICK A. SABBATON, OF TROY, NEW YORK.

IMPROVEMENT IN COVERING FOR STEAM-BOILERS, &c.

Specification forming part of Letters Patent No. 101,527, dated April 5, 1870.

*To all whom it may concern:*

Be it known that we, JAMES E. SHARP, ELEAZER AINSWORTH, and FREDERICK A. SABBATON, of Troy, in the county of Rensselaer and State of New York, have invented a new and useful Improvement in Covering for Steam-Boilers, Steam-Pipes, &c.; and we do hereby declare that the following is a full, clear, and exact description thereof, which will enable others skilled in the art to make and use the same.

This invention relates to a new and useful improvement in mode of protecting steam-boilers, steam-pipes, or other articles from the effects of cold air, preventing thereby the condensation of steam and loss of heat; and it consists in the ingredients employed and method of application, as hereinafter more fully described.

The importance of protecting steam-boilers and steam-pipes by some non-conducting substance is well understood by engineers, and we have (as engineers) experimented largely, with a view of discovering some substance or composition which would be effectual for the purpose intended, and which could be cheaply afforded. Experiments have proved that we have succeeded in producing a good non-conductor for covering boilers and pipes, which may be applied with the greatest economy in expense, be very durable, and equal to the best felt or other coating now in use for preventing the condensation of steam, and for purposes of a similar nature.

We form our coverings of two coatings—first, an inner coat, composed of the following ingredients, in about the proportions named, viz: sawdust, one bushel; rye-paste, four pounds; alum, (dissolved,) one-half pound; hair, one quart.

Dextrine may be used in this composition, if desired.

This composition is applied with a trowel, or in any other manner, and to any desired thickness.

This covering is coated with a composition composed of some mineral substance, such as mineral paint, oxide of iron, or ground slate, mixed in the proportion of about one-half pound of rye-paste to two pounds of metallic paint, oxide of iron, or ground slate, and either with or without a small quantity of either dextrine or coal-tar.

We use no lime or plaster-of-paris, which substances adhere to the iron and do not shrink. Our covering shrinks from the iron of the boiler or pipe, and leaves an air-space, which adds greatly to the protection afforded by any non-conducting substance. A stratum of air is left between the coating and iron, and it is well known that air itself is a better non-conductor of heat than any solid substance ordinarily used for this purpose.

Having thus described our invention, we claim as new and desire to secure by Letters Patent—

1. Covering steam-boilers, steam-pipes, and other similar articles, substantially in the manner described, and for the purposes set forth.

2. The use of sawdust for the coating of boilers or pipes, when the same has been saturated with alum or other substance to render it non-combustible, and combined with any glutinous substance to render it adhesive, substantially as described.

JAMES E. SHARP.
ELEAZER AINSWORTH.
FREDERICK A. SABBATON.

Witnesses:
MICHAEL MCMURRAY,
MICHAEL COFFEY.